US012358024B1

(12) United States Patent
Pasumarthi et al.

(10) Patent No.: US 12,358,024 B1
(45) Date of Patent: Jul. 15, 2025

(54) MULTI-CHECK IN-LINE CONTAINER INSPECTION SYSTEM

(71) Applicant: Amazon Technologies, Inc., Seattle, WA (US)

(72) Inventors: Vishnuvardhan Pasumarthi, Auburn, WA (US); Anderson Rafael Ospino Calvo, Renton, WA (US); Ahmet Goktug Dazkir, Sammamish, WA (US); Carter Lee Brown, Rio Rancho, NM (US); Ryan Harrison Pastor, South Haven, MI (US); Mitchell J Kepic, Vermilion, OH (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 18/215,928

(22) Filed: Jun. 29, 2023

(51) Int. Cl.
*B07C 5/34* (2006.01)
*B07C 5/18* (2006.01)

(52) U.S. Cl.
CPC .............. *B07C 5/3404* (2013.01); *B07C 5/18* (2013.01); *B07C 5/3412* (2013.01)

(58) Field of Classification Search
CPC ..... B07C 5/3404; B07C 5/3412; B07C 5/342; B07C 5/32
USPC .......................................... 209/552, 555, 558
See application file for complete search history.

(56) References Cited

U.S. PATENT DOCUMENTS

| | | | | |
|---|---|---|---|---|
| 7,814,734 B2 * | 10/2010 | Bilkie, Jr. | ............... | B65B 55/20 493/464 |
| 8,489,232 B2 * | 7/2013 | Mishra | ..................... | H04N 7/18 235/384 |
| 2020/0124484 A1 * | 4/2020 | Fuller | ..................... | G06Q 50/04 |
| 2022/0127083 A1 * | 4/2022 | Elmardini | .............. | B65G 47/31 |

* cited by examiner

*Primary Examiner* — Michael McCullough
*Assistant Examiner* — Molly K Devine
(74) *Attorney, Agent, or Firm* — Kilpatrick Townsend & Stockton LLP

(57) ABSTRACT

Techniques for a multi-check in-line container inspection system are provided herein. In an example, a computer system determines, during movement of a container in a scanning tunnel, first sensor data generated by a first sensor attached to a frame that forms the scanning tunnel. The movement is caused by material handling equipment. The computer system determines, during the movement of the container in the scanning tunnel, second sensor data generated by a second sensor attached to the frame. The computer system performs a first container integrity check based on the first sensor data and a second container integrity check based on the second sensor data. The computer system causes a corrective action to be initiated based on at least one of the first container integrity check or the second container integrity check indicating a container defect.

20 Claims, 14 Drawing Sheets

MULTI-CHECK IN-LINE CONTAINER INSPECTION SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and man-power, can result in lower throughput, unacceptably long response times, an ever-increasing backlog of unfinished or incorrectly finished tasks, and, in general, poor system performance.

BRIEF DESCRIPTION OF THE DRAWINGS

Various embodiments in accordance with the present disclosure will be described with reference to the drawings, in which.

DETAILED DESCRIPTION

Figure 1:
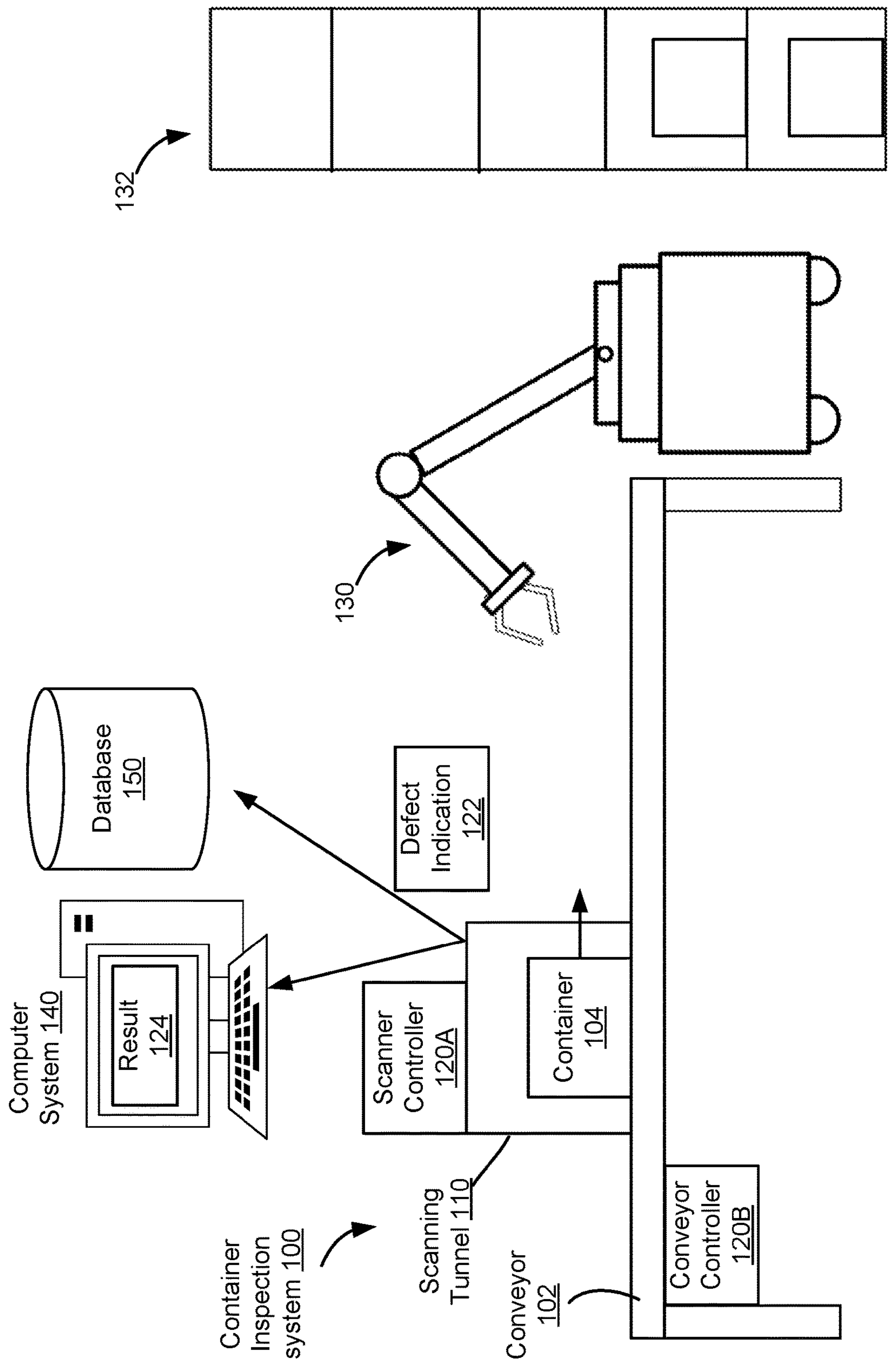
FIG. 1 illustrates an example of container inspection system, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, multi-check in-line container inspection. Defects of a container can be detected based on sensor data of sensors attached to a frame of a multi-check in-line container inspection system. The frame can form a scanning tunnel through which the container is moved. The sensors may include, for example, one or more photo eyes, a three-dimensional scanner, a container identification reader (e.g., a barcode reader, a radio frequency identification (RFID) reader, a quick response (QR) code reader, etc.), a weight sensor, and/or a red, green, blue (RGB) camera. The frame can be installed in line relative to a material handling equipment that moves the container (e.g., the scanning tunnel can surround a portion of a conveyor belt or conveyor rollers). Container integrity checks can be performed based on the sensor data to determine whether one or more defects are associated with the container. For instance, the container integrity checks may relate to container identifier read (e.g., to determine whether all barcodes of the container are present and/or readable), a container fill level (to determine whether the container is over-filled or under-filled), an item over-height detection (to determine if an item expands beyond an upper surface of the container), a container weight (e.g., if the container is over-weight or under-weight), a container assembly (e.g., if the container is properly assembled such that its corners properly mate), a container crack (e.g., if the container includes a crack on one or more sides), or a container warping (e.g., if the walls of the container are warped). If one or more of the container integrity checks indicate a defect, a corrective action can be taken for the container, such as diverting the container to an area designated for defective containers.

To illustrate, consider an example of a conveyor in an inventory handling system. Containers move along the conveyor, which is controlled by a conveyor controller. The containers can pass through a scanning tunnel, which includes an inspection controller that receives sensor data from various sensors of the scanning tunnel. For instance, the inspection controller can receive sensor data from a barcode reader and a three-dimensional scanner. The inspection controller performs a container fill integrity check based on sensor data from the three-dimensional scanner to determine whether a fill level of the container is within a fill range. In addition, the inspection controller performs a container identifier read to determine whether a barcode of the container is readable. If the fill level is outside of the fill range and/or the barcode is not readable, the inspection controller determines that the container is defective. In response, the inspection controller sends an indication of the defect to the conveyor controller, which causes the container to be rerouted on the conveyor to an area designated for defective containers.

Embodiments of the present disclosure provide several technical advantages over conventional container inspection systems. For instance, a scanning tunnel of the container inspection system can be mounted in-line with material handling equipment, meaning that containers do not need to be stopped or diverted to be analyzed for defects. In addition, the scanning tunnel can include multiple types of sensors so that containers can be analyzed for various defects simultaneously. The analysis may be performed in real-time to the containers moving through the scanning tunnel, and corrective actions can be performed for containers before the containers even reach an end of the material handling equipment. In this way, the overall throughout of the material handling equipment can be increased, while reducing detects to containers and possible damage to items or portions of the material handling equipment. In addition, the container inspection system can include a container detector before the scanning tunnel, which triggers processing of sensor data. Thus, if no container is detected, computing resources can be conserved until a container is detected.

FIG. 1 illustrates an example of container inspection system 100, according to a particular embodiment. At least portion of the container inspection system 100 (e.g., its frame) can be installed in-line with a conveyor 102 to form a scanning tunnel 110 that surrounds a portion of the conveyor 102. The conveyor 102 may be a conveyor belt and/or may include conveyor rolls. The conveyor 102 is an example of material handling equipment that can move a container 104. Other examples of material handling equipment may be a slide, airtight tubes, a robot, a pallet jack, and the like. Movement of the conveyor 102 may be controlled by a controller 120B (referred to also as a conveyor controller 120B), such as a programmable logic controller (PLC), a microcontroller, a memory and processor (e.g., central processing unit or graphics processing unit), a computer, a server, etc.

The scanning tunnel 110 can be mounted around a portion of the conveyor 102 to surround at least a section of the conveyor belt or a set of the conveyor rolls. Although not shown in FIG. 1, the scanning tunnel 110 can include multiple sensors of different sensor types that generate sensor data as the container 104 moves in the scanning tunnel 110. The sensors may be photo eyes, three-dimensional scanners, barcode readers, weight sensors, and/or encoders. In addition, the scanning tunnel 110 can include a controller 120A (referred to also as a scanner controller 120A) that receives the sensor data and performs container integrity checks to determine an integrity of the container 104. The container integrity checks are performed in real-time as the container 104 moves through the scanning tunnel 110. The controller 120A may be installed on the frame of the scanning tunnel 110 or may be remote therefrom (e.g., wireless or wired connection with a network interface card to receive the sensor data). Alternatively, the controller 120A may be separate from the scanning tunnel 110. For instance, the controller 120A may be a server hosting a service, such as a cloud service that receives and processes the sensor data.

The integrity checks may involve determining a container identifier read (e.g., barcode, quick response (QR) code, radio frequency identification (RFID), etc.), a container fill level, an item over-height detection, a container weight, a container assembly, a container crack, or a container warping. The scanner controller 120A can send an indication to the conveyor controller 120B about whether the integrity checks indicate a defect of the container 104. For instance, if the container identifier check results in an incomplete or an inaccurate read of the container identifier, the scanner controller 120A can determine that there is a container defect. So, the scanner controller 120A can send a defect indication 122 to the conveyor controller 120B indicating the container defect. The defect indication 122 can be sent in real-time (e.g., as the container 104 is passing through the tunnel or a soon as the container 104 exits the tunnel, where this exit can be detected based on sensor data from one of the sensors installed in the scanning tunnel 110 near its exit or on the conveyor 102 by the exit from the scanning tunnel 110). The conveyor controller 120B can then cause a corrective action to be initiated by the conveyor 102 after the container 104 exits the scanning tunnel 110. As an example, the corrective action may be causing the container 104 to be moved from a first conveyor lane to a second conveyor lane that is associated with defective containers. Alternatively, the corrective action may be causing a robotic manipulator 130 of the container inspection system 100 to pick up the container 104 and place the container 104 in an area for defective containers. In an example, the defect indication 122 can indicate the type of the defect. The corrective action can depend on the type of the defect. For instance, a barcode defect (e.g., missing barcode or unreadable defect) can cause the container 104 to be moved to one conveyor lane specific to barcode defects. In comparison, an incorrectly assembled container defect (e.g., the corners of the container 104 do not properly mate) can cause sending the container 104 to a station dedicated to assembly fixing.

The controller 120A may additionally send an indication of the inspection of the container 104 to a computer system 140. The computer system 140 may be in a control room associated with the container inspection system 100 and can display a result 124 of the inspection of the container 104 based on the received indication in real-time to the container 104 moving through the scanning tunnel 110. In this way, container defects may be monitored in real-time as the containers are being processed.

In an example, if the scanner controller 120A determines that the container 104 is not defective, the indication sent to the conveyor controller 120B may indicate that no corrective action is to be initiated. As a result, the container 104 can remain on the first conveyor lane until reaching an end of the conveyor 102. Then, the robotic manipulator 130 can pick up the container 104 and place the container 104 into a vertical rack 132 of containers for subsequent inventory actions.

A database 150 may also be accessible to the scanner controller 120A. The database 150 can receive and store the sensor data and the indication from the scanner controller 120A. In an example, the stored sensor data and indications may be used for auditing and/or to train a machine learning model to detect container defects.

Figure 2:
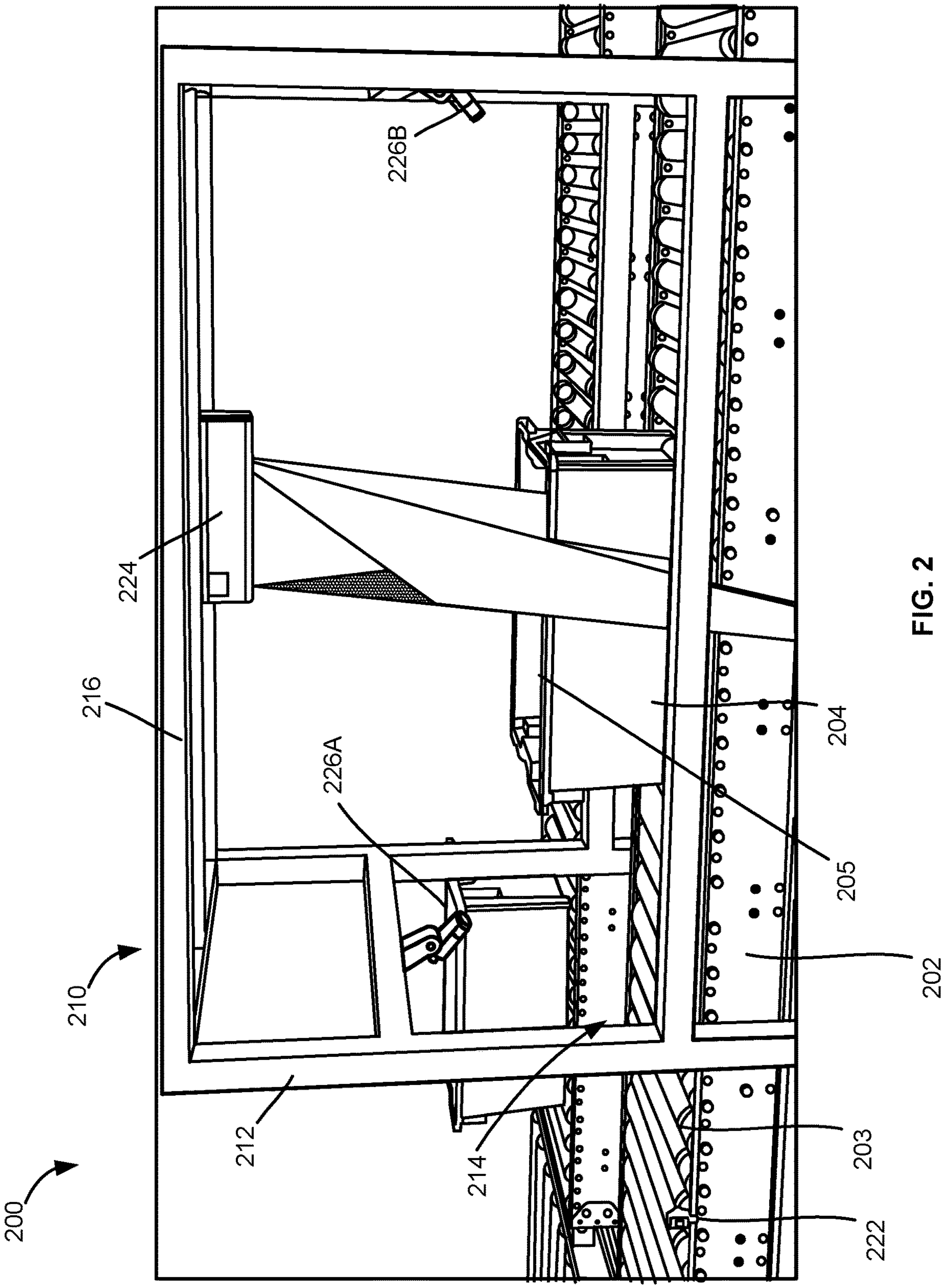
FIG. 2 illustrates an example of sensors of a container inspection system, according to an embodiment of the present disclosure.

FIG. 2 illustrates an example of sensors of a container inspection system 200, according to an embodiment of the present disclosure. The container inspection system 200 can be an example of the container inspection system 100 and can interface or integrate with a conveyor 202 and form a scanning tunnel 210 around at least a portion of the conveyor 202. A frame 212 defines the scanning tunnel 210 and is mounted around a portion of the conveyor 202 and includes sensors of various sensor types. The frame 212 can be formed by multiple pieces (e.g., metal bars) assembled or welded together. The sensors can be affixed to the different pieces (e.g., legs, walls, bars, etc.) of the frame 212. Although not illustrated, a housing (which can be transparent, such as one made with optically transparent plastic) can surround at least a portion of the frame 212.

The sensors can generate sensor data about a container 204 as the conveyor 202 moves the container 204 into and through the scanning tunnel 210. For instance, the sensors may include a photo eye 222 positioned outside of an entrance 214 of the scanning tunnel 210 through which the container 204 is moved into the scanning tunnel 210. The photo eye 222 can generate sensor data indicating a detection of the container 204 prior to the container 204 reaching the entrance 214. The photo eye 222 can send the sensor data to a controller (e.g., the scanner controller 120A in FIG. 1), which can begin processing additional sensor data of the other sensors based on the detection.

In an example, the sensors can also include a three-dimensional scanner 224 attached to an upper surface 216 of the frame 212. The three-dimensional scanner 224 can have a field of view directed inside the scanning tunnel 210. The three-dimensional scanner 224 may generate sensor data that is used for container integrity checks involving detecting a fill level of the container 204 and/or an item over-height detection. For the fill level integrity check, the sensor data can represent a volume percentage of the container 204. If the controller determines, based on the sensor data, that the fill level is outside of a fill range, the controller may determine that the container 204 has a defect. In addition, if the controller determines that at least a portion of an item in the container 204 extends beyond an upper surface 205 of the container 204, the controller may determine that the container 204 has a defect.

The sensor data from the three-dimensional scanner 224 may additionally be used for crack detection to determine whether the container 204 includes a crack. The sensor data can include image data. A computer vision algorithm can be used to process the image data and detect cracks, if any. The processing can involve determining a pixel color change (e.g., from blue, the color of the container 204, to white or black) and the number of pixels in the pixel color change. If the number of pixels of an edge exceeds a threshold, the controller can determine that the container 204 includes a crack defect.

The sensors can also include container identification readers 226A-226B that read container identifiers (e.g., barcodes, QR codes, RFIDs, etc.) of the container 204. The container identification readers 226A-226B are attached to respective locations of the frame 212 based on expected locations of the container identifiers installed on the container 204. For instance, FIG. 2 illustrates the container identification readers 226A-226B being on opposite sides of the frame 212, indicating that the container identifiers of the container 204 are expected to be on opposite sides of the container 204, but other placements are possible. The container identification readers 226A-226B generate sensor data corresponding to reads of the container identifiers. If the controller determines that either of the reads does not detect a container identifier, or if an incorrect container is detected, the controller may determine that the container 204 has a defect.

Although not shown in FIG. 2, the scanning tunnel 210 may include a first side rail attached to the frame 212 and parallel to a conveyor surface 203 of the conveyor 202. The scanning tunnel 210 can also include a second side rail attached to the frame 212, opposite to the first side rail and parallel to the conveyor surface 203. The first side rail and the second side rail can form an area centered in the scanning tunnel 210 and over the conveyor surface 203 such that the container 204 is moved through the area within the scanning tunnel 210. Thereby, as containers enter the scanning tunnel 210, they can be centered.

Figure 3:
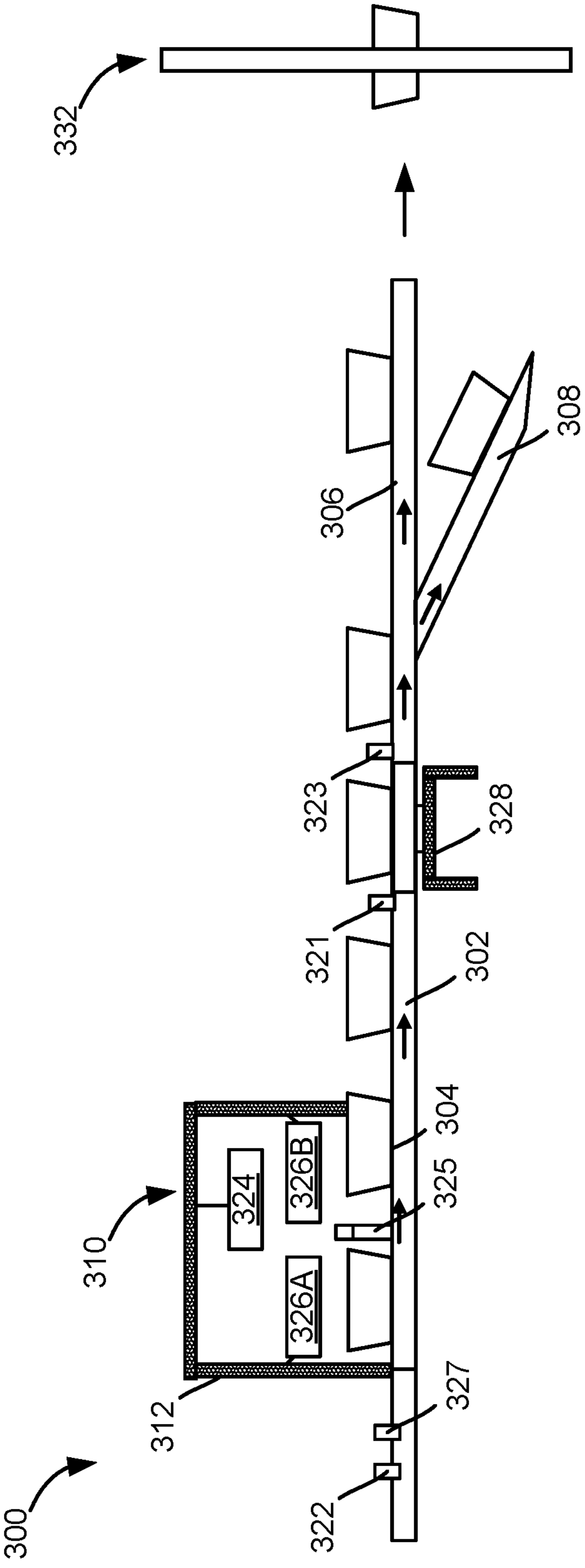
FIG. 3 illustrates another example of sensors of a container inspection system, according to an embodiment of the present disclosure.

FIG. 3 illustrates another example of sensors of a container inspection system 300, according to an embodiment of the present disclosure. The container inspection system 300 can be an example of the container inspection system 100 and can interface or integrate with a conveyor 302 and form a scanning tunnel 310 around at least a portion of the conveyor 302. A frame 312 of the scanning tunnel 310 is mounted around a portion of the conveyor 302 and includes sensors of various sensor types.

Similar to FIG. 2, the sensors can include a photo eye 322 before an entrance of the scanning tunnel 310, a three-dimensional scanner 324, and container identification readers 326A-326B. In addition, the sensors can include a set of encoders 327, a photo eye 325 located inside the scanning tunnel 310, and a weight sensor 328. The set of encoders 327 can generate sensor data indicating a speed of the container 304 or a container-to-container distance between containers on the conveyor 302. Based on the determined speed and/or the container-to-container distance, the controller may change the speed of the container 304, a rate at which sensor data is generated, or a rate at which sensor data is processed. As such, if the determined speed is determined to be too fast for the processing speed of the sensor data, either the speed can be reduced, or the rate of the processing can be increased.

The photo eye 325 inside the scanning tunnel 310 can be used for over-height detection. The photo eye 325 can be disposed at a height of an upper surface of the container 304 and can generate sensor data that can be used by the controller to determine an item over-height of a height of an item in the container 304 extending beyond the upper surface. The sensor data may indicate the item over-height and, based on the sensor data, the controller may trigger processing of data generated by the three-dimensional scanner 324 to determine an over-height defect of the container 304. If multiple types of containers are to be scanned, and each type has a different height, multiple photo eyes, each similar to the photo eye 325, can be used and each can be installed at the expected height of the corresponding type of container. Alternatively, the phot eye 325 can be mounted to an actuator controlled by the scanner controller to move the photo eye 325 to the proper height of a container depending on its type. To determine the container type, a container identifier reader sensor (e.g., a barcode sensor) can first generate sensor data indicating an identifier of the container. Next, the scanner controller can look up a database (local or remote) to determine the type of the container and its corresponding height. The scanner controller can then control which of the photo eyes to activate (e.g., in the case of multiple photo eyes) or can control the actuator to move the photo eye 325 to the proper height.

In an example, the weight sensor 328 is installed in-line in the conveyor 302 inside or outside of the scanning tunnel 310. In FIG. 3, the weight sensor 328 is illustrated as being outside of the scanning tunnel 310 after the container 304 moves through the scanning tunnel 310. But the weight sensor 328 may alternatively be outside of the scanning tunnel 310 before an entrance of the scanning tunnel 310, or inside of the scanning tunnel 310. In an example, a first photo eye 321 may detect the container 304. The detection of the container 304 can trigger the weight sensor 328 to start measuring weight. Then, a second photo eye 323 can detect the container 304, indicating the container 304 is leaving the weight detection area. So, the detection by the second photo eye 323 can cause the weight measurement to stop. The scanner controller can then average the weight measurements taken between the detection by the first photo eye 321 and the detection by the second photo eye 323 to determine the weight of the container 304. The scanner controller may determine a type of container (e.g., size, shape, etc.) and a weight range (e.g., five pounds to thirty-five pounds) that is associated with the type of container. If the weight is outside of the weight range, the scanner controller may determine that the container 304 has a defect.

In another example, the weight sensor 328 can be weight scale positioned underneath a section of a conveyor belt and can become in contact with the conveyor belt upon the container 324 being over the section. In another example, the weight sensor 328 can be distributed among a plurality of conveyor roller and can measure the weight of the container 324 when the container 324 is in contact with such rollers. For example, the end of the rolls can be actuated vertically. The actuation distance and/or pressure can be correlated to the weight. As the container 304 moves over the weight sensor 328, the scanner controller can receive weight data and determine whether the weight is outside of the weight range. If the weight is outside of the weight range, the scanner controller may determine that the container 304 has a defect.

If any defect is detected for the container 304, the scanner controller can cause a corrective action to be initiated. The scanner controller may send an indication of the defect to a conveyor controller associated with the conveyor 302, which initiates the corrective action. For instance, the conveyor controller of the conveyor 302 may cause the container 304 to be moved from a first conveyor lane 306 to a second conveyor lane 308. The frame 312 is in-line with the first conveyor lane 306 and the second conveyor lane 308 is associated with defective containers. Once reaching an end of the first conveyor lane 306 or the second conveyor lane 308, a robotic manipulator (e.g., robotic manipulator 130 in FIG. 1) may pick up the container 304 and move the container 304 to a particular area. For instance, if the container 304 does not have a defect, the robotic manipulator may move the container 304 from the conveyor 302 and store the container 304 in a rack 332.

Figure 4:
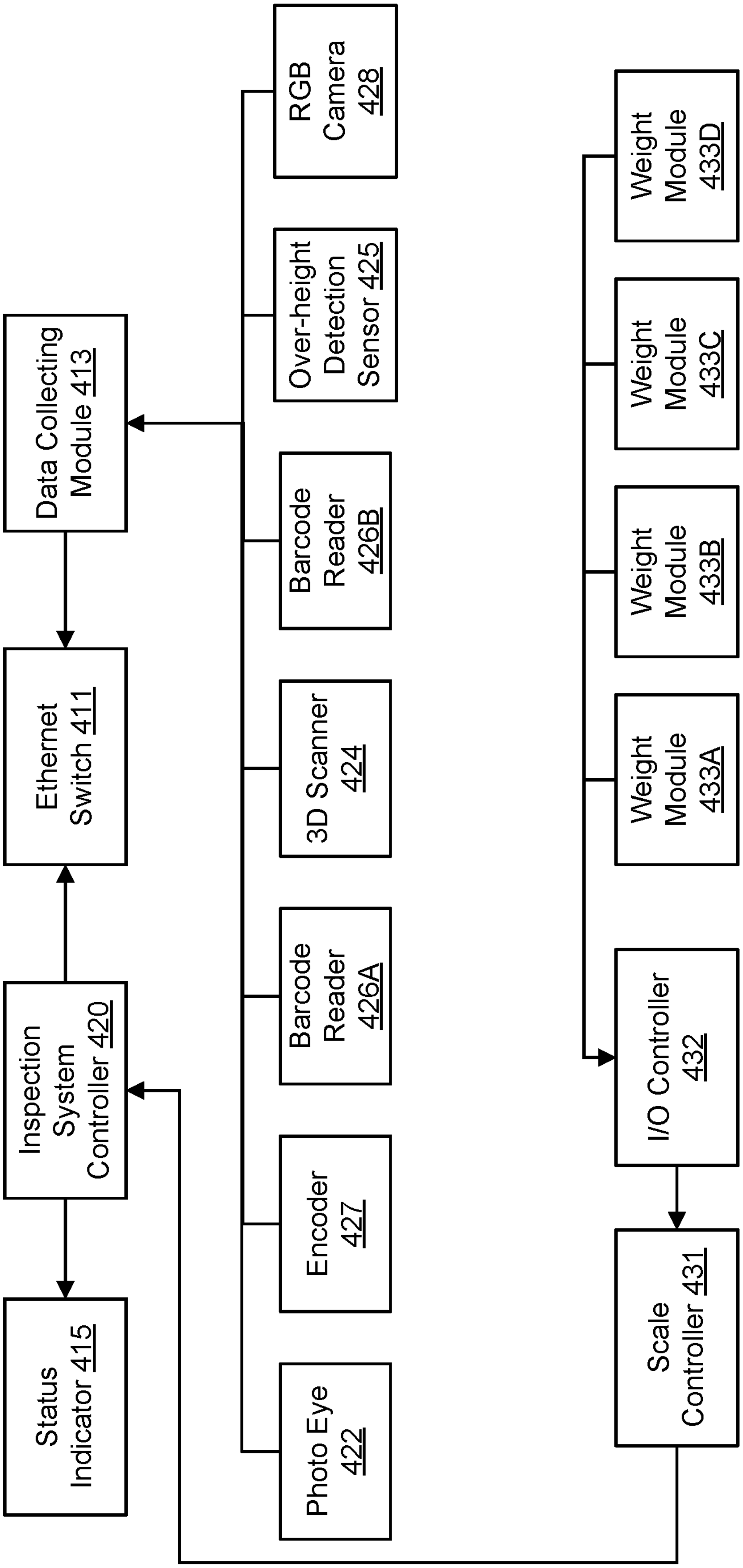
FIG. 4 illustrates components of a container inspection system, according to an embodiment of the present disclosure.

FIG. 4 illustrates components of a container inspection system, according to an embodiment of the present disclosure. The container inspection system (e.g., container inspection system 100 in FIG. 1) can include an inspection system controller 420 (e.g., a scanner controller) that is wired to a data collecting module 413 via an Ethernet switch 411. Alternatively, the inspection system controller 420 may have a wireless connection to the data collecting module 413.

In an example, the data collecting module 413 receives sensor data from a photo eye 422, an encoder 427, a barcode reader 426A (or any other container identification reader), a three-dimensional scanner 424, a barcode reader 426B, an over-height detection sensor 425 (e.g., photo eye 325 in FIG. 3), and a red, green, blue (RGB) camera 428. The RGB camera 428 may be used to validate the processing of other sensor data or as an alternative to the three-dimensional scanner 424 to detect over-fill, over-height, warping, and assembly defects of containers. The three-dimensional scanner 424 and/or the RGB camera 428 may detect an orientation of a container and then adjust the processing of the sensor data given the orientation. we can detect orientation of container and then adjust the processing given that orientation. For instance, if the orientation indicates that barcodes won't be read, then inaccurate container identifier reads may not result in a detection of a barcode failure. As another example, for a given orientation, the scanner container may determine how to measure the warping to determine whether the container has a warping defect. The data collecting module 413 sends the sensor data to the inspection system controller 420. In addition, the inspection system controller 420 receives weight sensor data about a weight of a container from a scale controller 431. Weight modules 433A-433D of a weight sensor send the weight sensor data to an input/output (I/O) controller, which sends the weight sensor data to the scale controller 431.

The inspection system controller 420 then determines, based on the sensor data, whether a container has a defect. If the container is determined to have a defect, the inspection system controller 420 can output a status indicator 415 of the defect. The status indicator 415 may be sent to a conveyor controller, which causes a corrective action to be taken.

Figure 5:
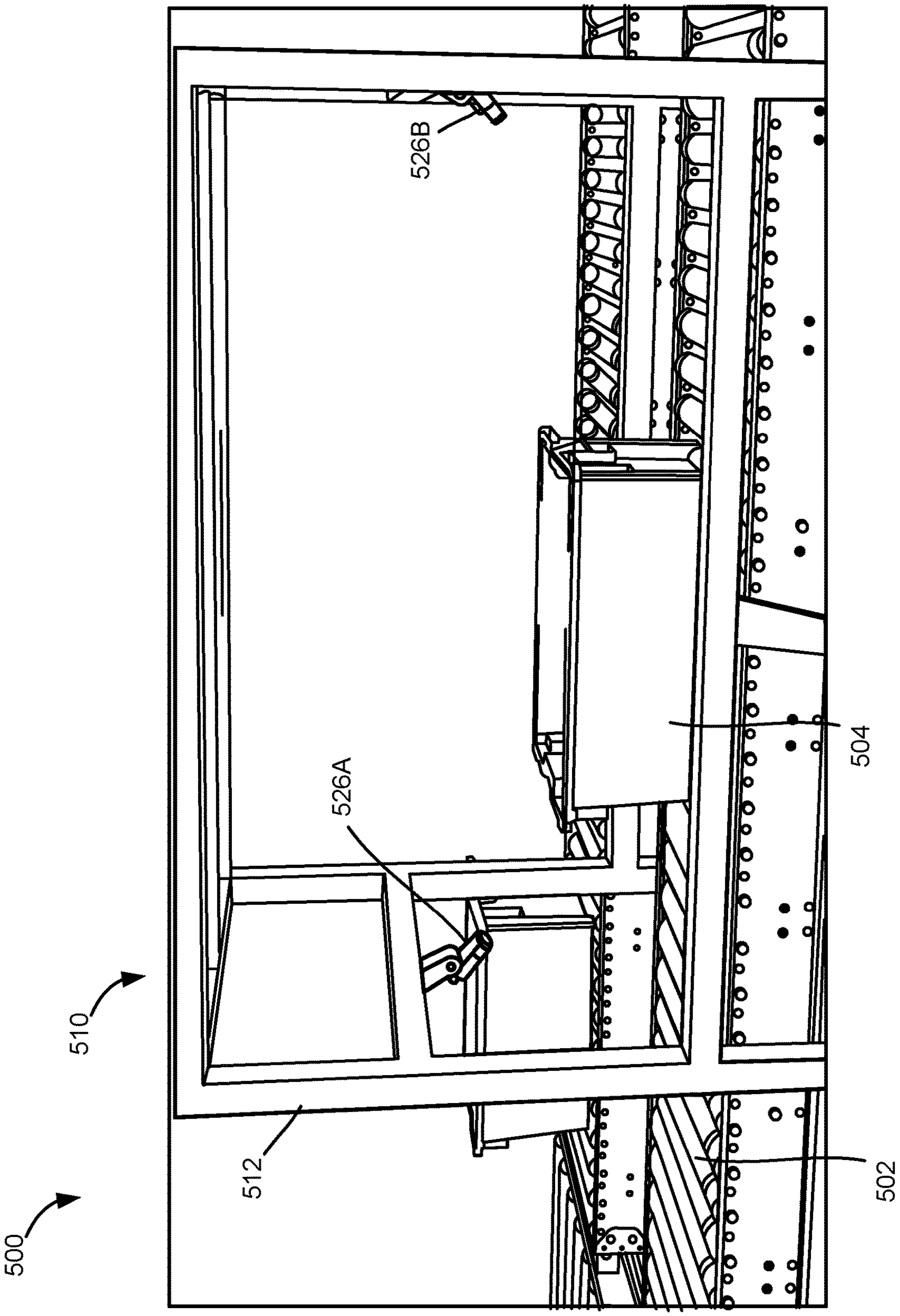
FIG. 5 illustrates an example of container identifier defect detection, according to an embodiment of the present disclosure.

FIG. 5 illustrates an example of container identifier defect detection, according to an embodiment of the present disclosure. A container inspection system 500 can be an example of the container inspection system 100 can interface or integrate with a conveyor 502 and form a scanning tunnel 510 around at least a portion of the conveyor 502. A frame 512 forms the scanning tunnel 510 and is mounted around a portion of the conveyor 502 and includes the sensors of various sensor types.

The sensors can include container identification readers 526A-526B that read container identifiers of the container 504. The container identification readers 526A-526B are attached to respective locations of the frame 512 based on expected locations of the container identifiers installed on the container 504. The container identification readers 526A-526B generate sensor data corresponding to reads of the container identifiers. If a controller determines, based on the sensor data, that either of the reads does not detect a container identifier, or if an incorrect container is detected, the controller may determine that the container 504 has a defect.

If the defect is detected for the container 504, the scanner controller can cause a corrective action to be initiated. The controller may send an indication of the defect to a conveyor controller associated with the conveyor 502, which initiates the corrective action. For instance, the conveyor controller of the conveyor 502 may cause the container 504 to be moved from a first conveyor lane to a second conveyor lane. Once reaching an end of the first conveyor lane or the second conveyor lane, a robotic manipulator (e.g., robotic manipulator 130 in FIG. 1) may pick up the container 504 and move the container 504 to a particular area. For instance, if the container 504 does not have a defect, the robotic manipulator may move the container 504 from the conveyor 502 and store the container 504 in a rack.

Figure 6:
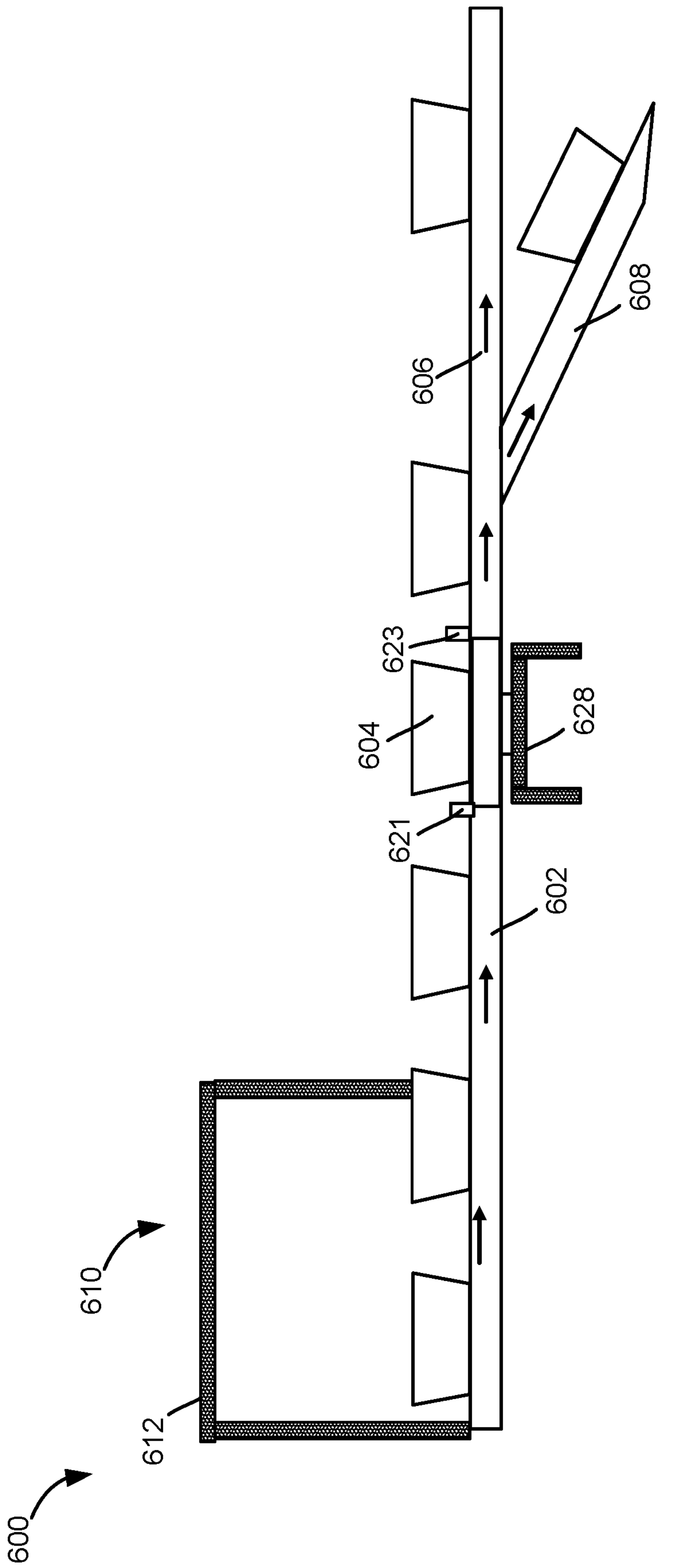
FIG. 6 illustrates an example of weight defect detection, according to an embodiment of the present disclosure.

FIG. 6 illustrates an example of weight defect detection, according to an embodiment of the present disclosure. A container inspection system 600 can be an example of the container inspection system 100 and can interface or integrate with a conveyor 602 and form a scanning tunnel 610 around at least a portion of the conveyor 602. A frame 612 forms the scanning tunnel 610 and is mounted around a portion of the conveyor 602 and includes the sensors of various sensor types.

In an example, a weight sensor 628 is installed in-line in the conveyor 602 inside or outside of the scanning tunnel 610. In FIG. 6, the weight sensor 628 is illustrated as being outside of the scanning tunnel 610 after the container 604 moves through the scanning tunnel 610. A scanner controller of the container inspection system 600 may determine a type of container (e.g., size, shape, etc.) and a weight range (e.g., ten pounds to fifty pounds) that is associated with the type of container. As explained above, the type can be determined upon a read of a container identifier by another sensor, where the container identifier can be looked up in a local or remote database to determine the container type. The look-up can also indicate the weight range. Alternatively, rather than a container identifier read by a sensor, the scanner controller can receive the container identifier from another source (e.g., from a conveyor controller) and perform the look-up. Once the container 604 is detected by a first photo eye 621, as the container 604 moves over the weight sensor 628, the scanner controller can receive weight data until the container 604 is detected by a second photo eye 623. The scanner controller can average weight measurements in the weight data to determine the weight of the container 604 and determine whether the weight is outside of the weight range. If the weight is outside of the weight range, the scanner controller may determine that the container 604 has a defect.

If the defect is detected for the container 604, the scanner controller can cause a corrective action to be initiated. The scanner controller may send an indication of the defect to a conveyor controller associated with the conveyor 602, which initiates the corrective action. For instance, the conveyor controller of the conveyor 602 may cause the container 604 to be moved from a first conveyor lane 606 to a second conveyor lane 608. Once reaching an end of the first conveyor lane 606 or the second conveyor lane 608, a robotic manipulator (e.g., robotic manipulator 130 in FIG. 1) may pick up the container 604 and move the container 604 to a particular area. For instance, if the container 604 does not have a defect, the robotic manipulator may move the container 604 from the conveyor 602 and store the container 604 in a rack.

Figure 7:
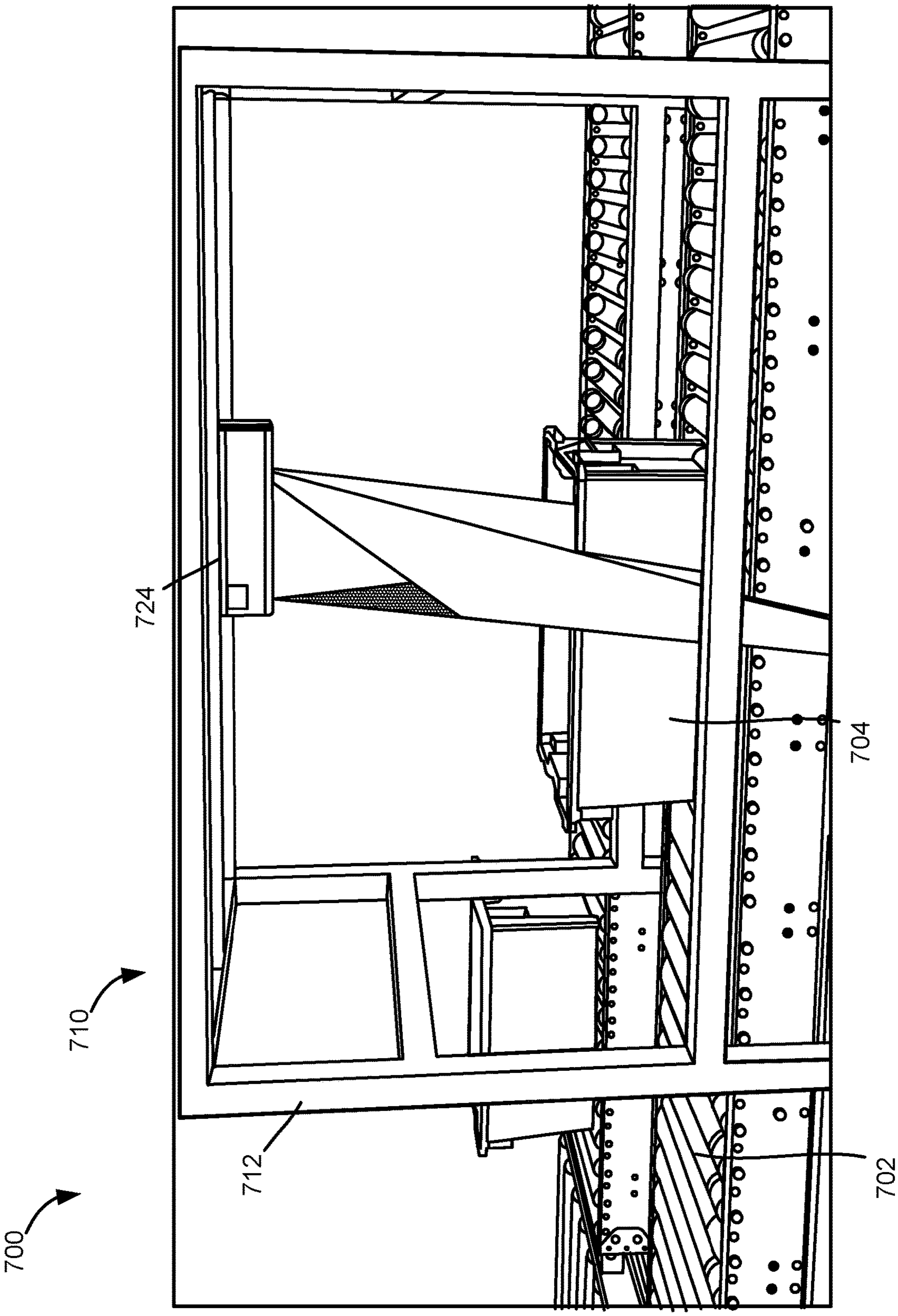
FIG. 7 illustrates an example of over-fill defect detection, according to an embodiment of the present disclosure.

FIG. 7 illustrates an example of over-fill defect detection, according to an embodiment of the present disclosure. A container inspection system 700 can be an example of the container inspection system 100 and can interface or integrate with a conveyor 702 and form a scanning tunnel 710 around at least a portion of the conveyor 702. A frame 712 forms the tunnel 710 and is mounted around a portion of the conveyor 702 and includes the sensors of various sensor types.

In an example, the sensors include a three-dimensional scanner 724 attached to an upper surface of the frame 712. The three-dimensional scanner 724 can have a field of view directed inside the scanning tunnel 710. The three-dimensional scanner 724 may generate sensor data (e.g., images) that is used for container integrity checks involving detecting a fill level of the container 704. For the fill level integrity check, a scanner controller of the container inspection system 700 may determine a type of the container 704 and a total volume of the container 704 based on the type. Based on the sensor data, the scanner controller may determine a used volume and/or a free volume of the container 704. The used volume corresponds to an occupancy of the container 704 by a set of items contained in the container 704. The scanner controller can then determine a fill level based on the total volume and the used volume and/or the free volume. The scanner controller can determine whether the fill level is within or outside of a fill range (e.g., 20%-80%). If the fill level is outside of the fill range, the scanner controller may determine that the container 704 has a fill level defect.

If the defect is detected for the container 704, the scanner controller can cause a corrective action to be initiated. The scanner controller may send an indication of the defect to a conveyor controller associated with the conveyor 702, which initiates the corrective action. For instance, the conveyor controller of the conveyor 702 may cause the container 704 to be moved from a first conveyor lane to a second conveyor lane. Once reaching an end of the first conveyor lane or the second conveyor lane, a robotic manipulator (e.g., robotic manipulator 130 in FIG. 1) may pick up the container 704 and move the container 704 to a particular area. For instance, if the container 704 does not have a defect, the robotic manipulator may move the container 704 from the conveyor 702 and store the container 704 in a rack.

Figure 8:
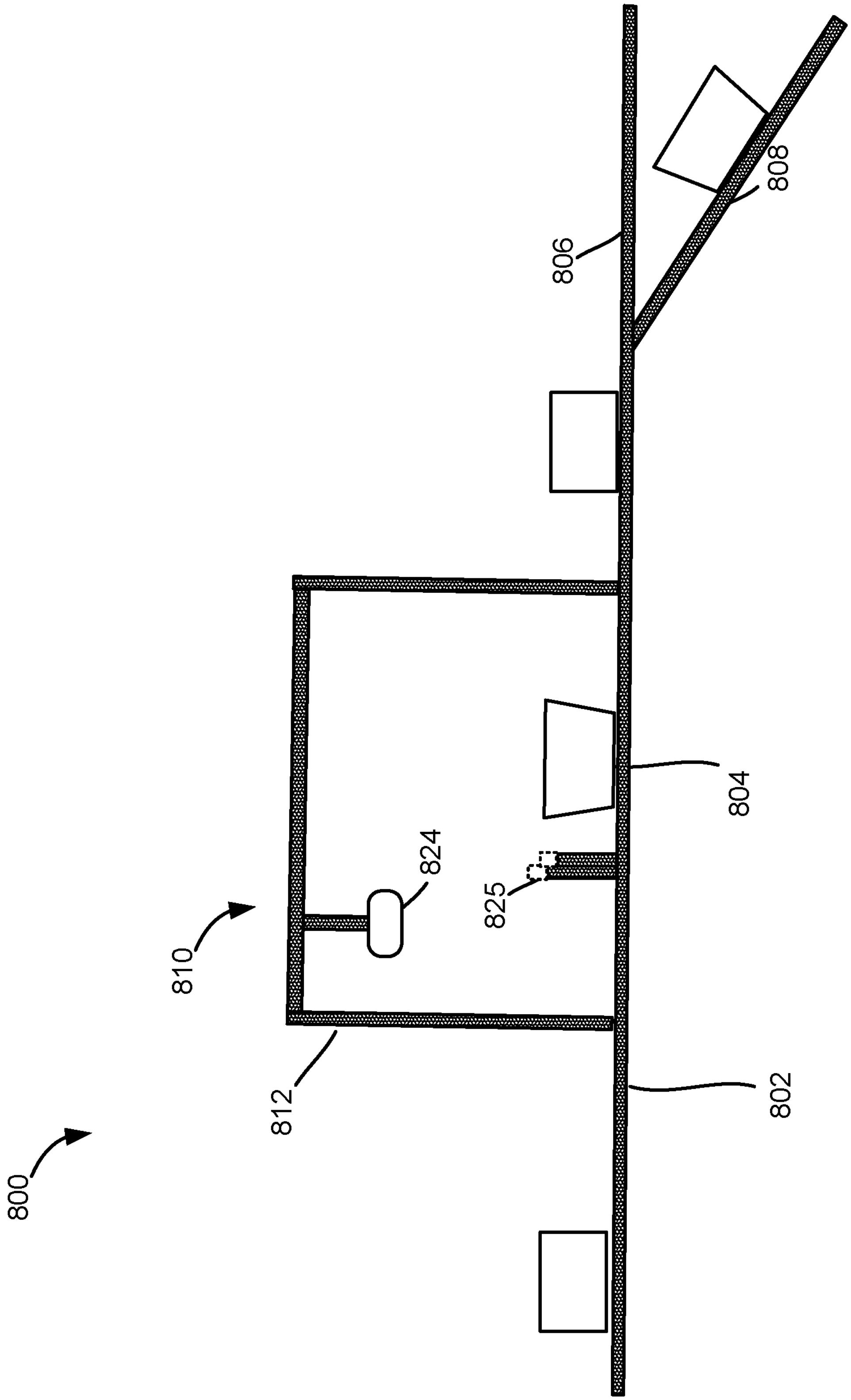
FIG. 8 illustrates an example of over-height defect detection, according to an embodiment of the present disclosure.

FIG. 8 illustrates an example of over-height defect detection, according to an embodiment of the present disclosure. A container inspection system 800 can be an example of the container inspection system 100 and can interface or integrate with a conveyor 802 and form a scanning tunnel 810 around at least a portion of the conveyor 802. A frame 812 forms the scanning tunnel 810 and is mounted around a portion of the conveyor 802 and includes the sensors of various sensor types.

A photo eye 825 inside the scanning tunnel 810 can be used for over-height detection. The photo eye 825 can be disposed at a height of an upper surface of the container 804 and can generate sensor data that can be used by a scanner controller of the container inspection system 800 to determine an item over-height of a height of an item in the container 804 extending beyond the upper surface. Since the conveyor 802 may transport different types of containers with different heights, the container inspection system 800 may include a set of photo eyes inside the scanning tunnel 810, and each photo eye can be disposed at a height of a particular type of container. From the sensor data and information about the type of the container 804, the scanner controller may determine an edge of an upper surface of the container 804 and that an item contained in the container 804 extends beyond the upper surface. The scanner controller may then trigger processing of data generated by a three-dimensional scanner 824 to determine an over-height level defect of the container 804.

If the defect is detected for the container 804, the scanner controller can cause a corrective action to be initiated. The scanner controller may send an indication of the defect to a conveyor controller associated with the conveyor 802, which initiates the corrective action. For instance, the conveyor controller of the conveyor 802 may cause the container 804 to be moved from a first conveyor lane 806 to a second conveyor lane 808. Once reaching an end of the first conveyor lane 806 or the second conveyor lane 808, a robotic manipulator (e.g., robotic manipulator 130 in FIG. 1) may pick up the container 804 and move the container 804 to a particular area. For instance, if the container 804 does not have a defect, the robotic manipulator may move the container 804 from the conveyor 802 and store the container 804 in a rack.

Figure 9:
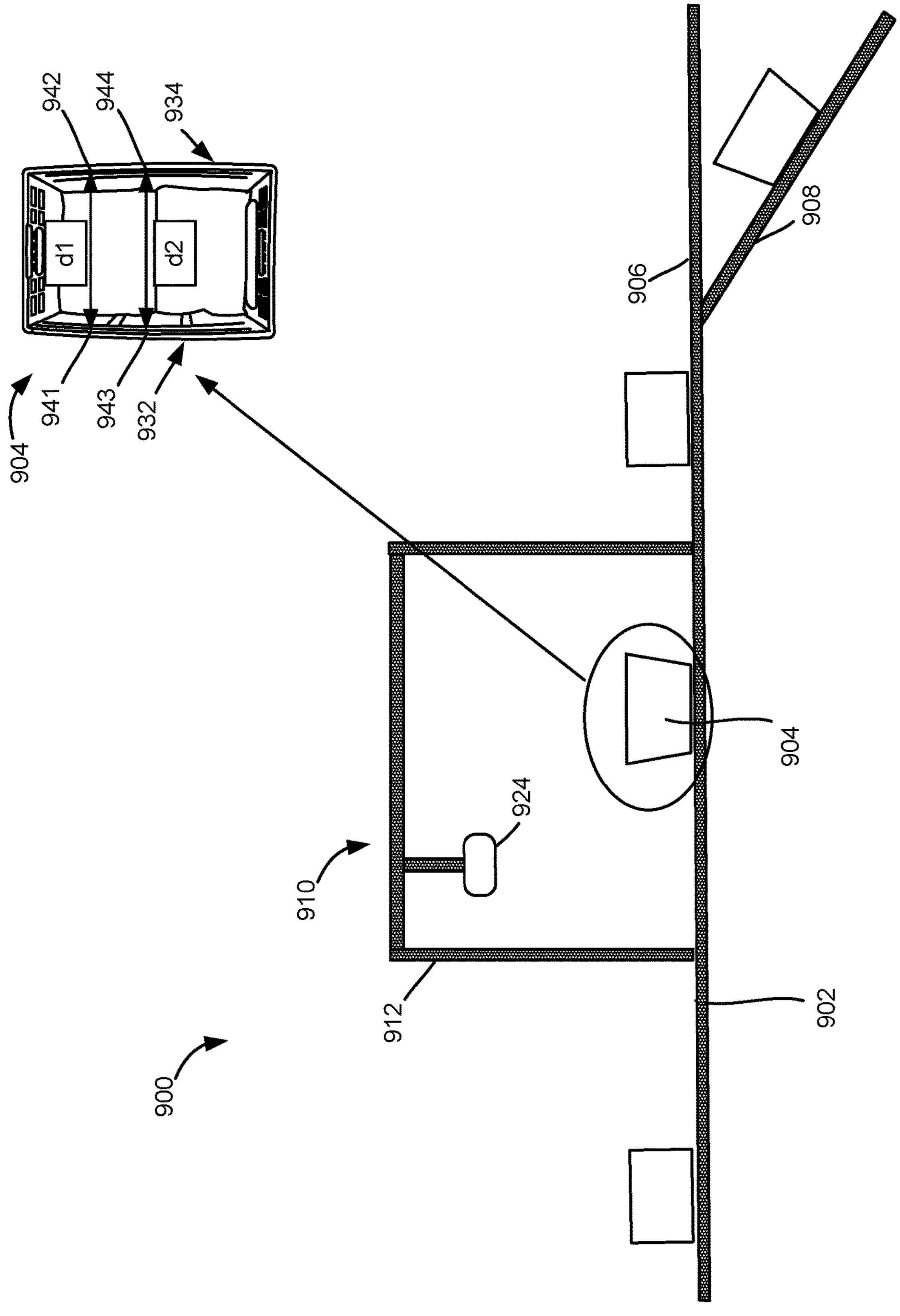
FIG. 9 illustrates an example of warping defect detection, according to an embodiment of the present disclosure.

FIG. 9 illustrates an example of warping defect detection, according to an embodiment of the present disclosure. A container inspection system 900 can be an example of the container inspection system 100 and can interface or integrate with a conveyor 902 and form a scanning tunnel 910 around at least a portion of the conveyor 902. A frame 912 forms the scanning tunnel 910 and is mounted around a portion of the conveyor 902 and includes the sensors of various sensor types.

In an example, the sensors include a three-dimensional scanner 924 attached to an upper surface of the frame 912. The three-dimensional scanner 924 can have a field of view directed inside the scanning tunnel 910. The three-dimensional scanner 924 may generate sensor data (e.g., images) that is used for container integrity checks involving detecting a warping of the container 904. Based on the sensor data, a scanner controller of the scanning tunnel 910 can determine a first distance (d1) between a first point 941 on a first wall 932 of the container 904 and a second point 942 on a second wall 934 of the container 904. The scanner controller can also determine a second distance (d2) between a third point 943 on the first wall 932 of the container 904 and a fourth point 944 on the second wall 934 of the container 904. Additional distances between points on the first wall 932 and the second wall 934 may also be determined. The scanner controller can then determine a difference between the first distance and the second distance. If the difference is larger than a threshold (e.g., 0.5 inches), the scanner controller can determine a warping defect of the container 904. When more than two distances are determined, multiple differences can be generated and compared to the threshold. Only if a certain number or a percentage of the differences exceeds the threshold, then the scanner container can declare a defect. In an example, a threshold depends on the type of the container (e.g., the larger or wider the container is, the larger the threshold is). In this case, the scanner controller can use a container identifier in a look-up to a local or remote database to determine the proper threshold to use.

If the defect is detected for the container 904, the scanner controller can cause a corrective action to be initiated. The scanner controller may send an indication of the defect to a conveyor controller associated with the conveyor 902, which initiates the corrective action. For instance, the conveyor controller of the conveyor 902 may cause the container 904 to be moved from a first conveyor lane 906 to a second conveyor lane 908. Once reaching an end of the first conveyor lane 906 or the second conveyor lane 908, a robotic manipulator (e.g., robotic manipulator 130 in FIG. 1) may pick up the container 904 and move the container 904 to a particular area. For instance, if the container 904 does not have a defect, the robotic manipulator may move the container 904 from the conveyor 902 and store the container 904 in a rack.

Figure 10:
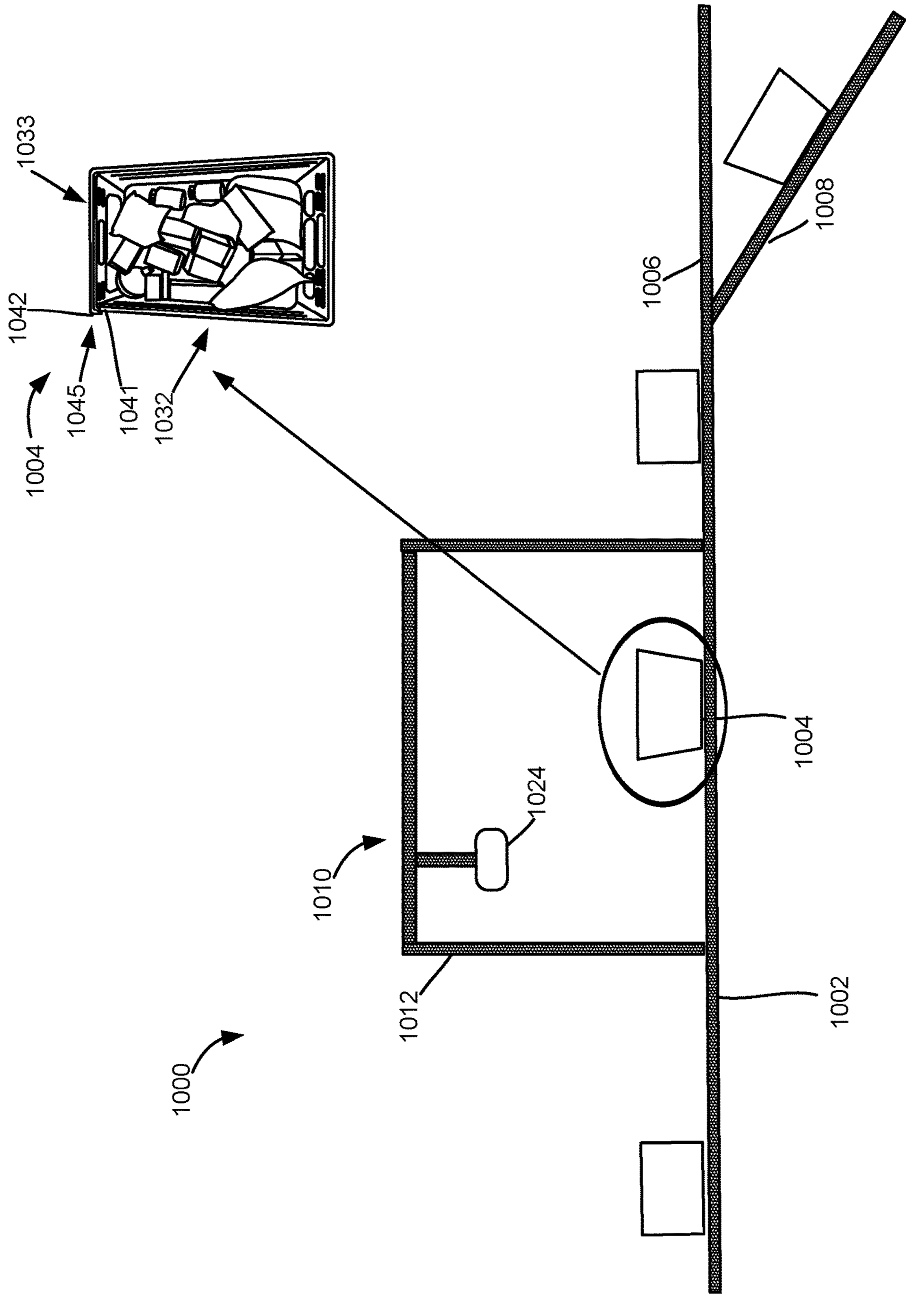
FIG. 10 illustrates an example of assembly defect detection, according to an embodiment of the present disclosure.

FIG. 10 illustrates an example of assembly defect detection, according to an embodiment of the present disclosure. A container inspection system 1000 can be an example of the container inspection system 100 and can interface or integrate with a conveyor 1002 and form a scanning tunnel 1010 around at least a portion of the conveyor 1002. A frame 1012 forms the scanning tunnel 1010 and is mounted around a portion of the conveyor 1002 and includes the sensors of various sensor types.

In an example, the sensors include a three-dimensional scanner 1024 attached to an upper surface of the frame 1012. The three-dimensional scanner 1024 can have a field of view directed inside the scanning tunnel 1010. The three-dimensional scanner 1024 may generate sensor data (e.g., images) that is used for container integrity checks involving detecting an assembly of the container 1004. Based on the sensor data, a scanner controller of the scanning tunnel 1010 can determine a corner 1045 of the container 1004. The corner 1045 is formed by a first wall 1032 and a second wall 1033 of the container 1004. The scanner controller can determine a distance between a first edge point 1041 of the first wall 1032 and a second edge point 1042 of the second wall 1033. The scanner controller can then determine of the distance is within a distance range. If the distance is outside of the distance range (e.g., larger than an upper bound or smaller than a lower bound of the distance range), the scanner controller can determine an assembly defect of the container 1004. In an example, a distance range depends on the type of the container (e.g., the larger or wider the container is, the larger the threshold is). In this case, the scanner controller can use a container identifier in a look-up to a local or remote database to determine the proper distance range to use.

If the defect is detected for the container 1004, the scanner controller can cause a corrective action to be initiated. The scanner controller may send an indication of the defect to a conveyor controller associated with the conveyor 1002, which initiates the corrective action. For instance, the conveyor controller of the conveyor 1002 may cause the container 1004 to be moved from a first conveyor lane 1006 to a second conveyor lane 1008. Once reaching an end of the first conveyor lane 1006 or the second conveyor lane 1008, a robotic manipulator (e.g., robotic manipulator 130 in FIG. 1) may pick up the container 1004 and move the container 1004 to a particular area. For instance, if the container 1004 does not have a defect, the robotic manipulator may move the container 1004 from the conveyor 1002 and store the container 1004 in a rack.

Although in the previous figures, a scanner controller is described as causing a corrective action and a conveyor controller as initiating the corrective action, the embodiments of the present disclosure are not limited as such. For example, these two controllers can be integrated as a single controller. In another example, the scanner controller can initiate the corrective action. For instance, the scanner controller can control a gate installed on a conveyor at a distance after the exist from a scanning tunnel. The gate can be at a split between two conveyor lanes: a first lane for containers that are not associated with defects, and a second lane for containers associated with defects. The scanner controller can actuate the gate to cause a defective container to move to the second lane. In yet another example, the scanner controller can control a robotic manipulator to handle a defective container.

Figure 11:
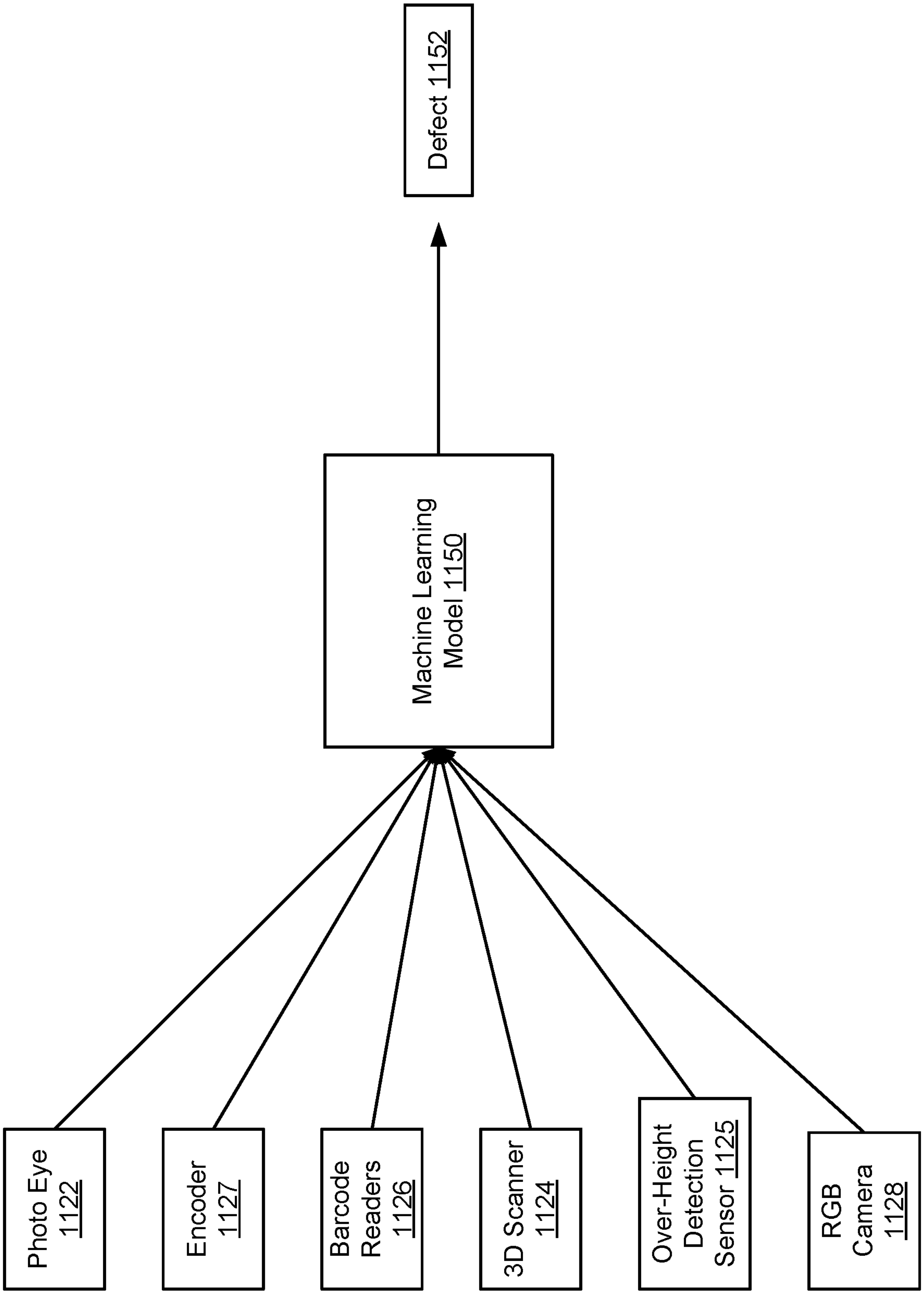
FIG. 11 illustrates an example of a machine learning model for determining defects of containers from sensor data, according to an embodiment of the present disclosure.

FIG. 11 illustrates an example of a machine learning model 1150 for determining defects of containers from sensor data, according to an embodiment of the present disclosure. The machine learning model 1150 can be trained to predict a defect of a container. Training data may involve previous sensor data for containers and labels of associated defects. The machine learning model 1150 can be trained using the labels to minimize a loss function associated with predicting the defects.

Once trained, the machine learning model 1150 can be stored as program code on a scanner controller. The scanner controller can execute this program code and provide an input to the machines learning model. The input can be based on sensor data generated from at least two sensors while a container is moving through a scanning tunnel. For instance, the sensors can include a photo eye 1122, an encoder 1127, barcode readers 1126 (or any other container identification reader), a three-dimensional scanner 1124, an over-height detection sensor 1125 (e.g., photo eye 325 in FIG. 3), and a RGB camera 1128. Based on the input, the machine learning model can output an indication of a defect 1152. The indication of the defect 1152 may be sent by the scanner controller to a conveyor controller of a conveyor that causes a corrective action to be initiated.

Figure 12:
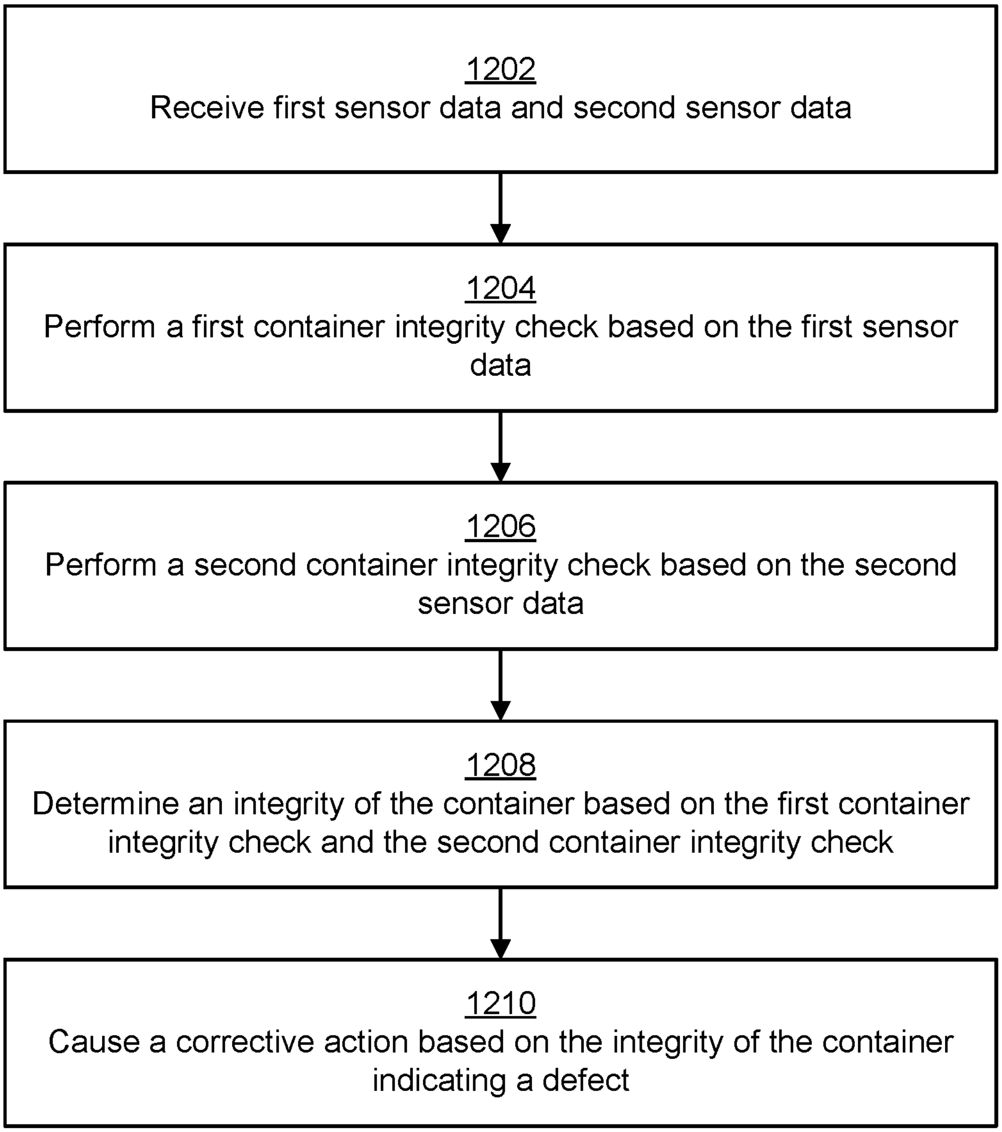
FIG. 12 illustrates an example of a flow for multi-check in-line container inspection.
Figure 13:
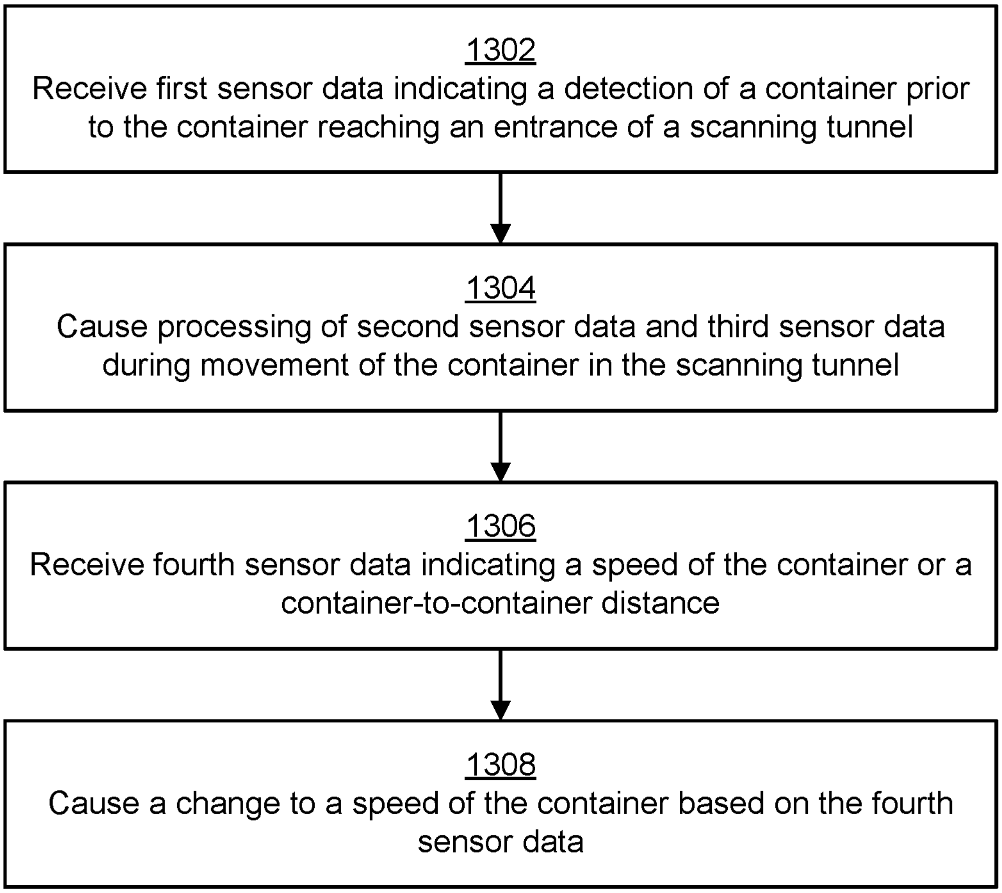
FIG. 13 illustrates an example of a flow for initiating and modifying container inspection.

FIGS. 12-13 illustrate processes for container inspection. As described below, operations of the flows can be performed by a controller, such as the scanner controller 120A. Some or all of the instructions for performing the operations can be implemented as hardware circuitry and/or stored as computer-readable instructions on a non-transitory computer-readable medium of the controller. As implemented, the instructions represent modules that include circuitry or code executable by processor(s) of the controller. The use of such instructions configures the controller to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 12 illustrates an example of a flow for multi-check in-line container inspection. In an example, the flow includes operation 1202, where the controller receives first sensor data and second sensor data. The first sensor data is generated by a first sensor having a first sensor type and the second sensor data is generated by a second sensor having a second sensor type during movement of a container in a scanning tunnel of a container inspection system. The scanning tunnel is mounted over a portion of material handling equipment including at least one of a conveyor belt or a set of conveyor rolls.

In an example, the flow includes operation 1204, where the controller performs a first container integrity check based on the first sensor data. For instance, if the first sensor is a container identification reader, the first container integrity check may be a container identifier read. Other container integrity checks involve a container fill level, an item over-height detection, a container assembly, or a container warping.

In an example, the flow includes operation 1206, where the controller performs a second container integrity check based on the second sensor data. For instance, if the second sensor is a three-dimensional scanner, the second container integrity check may be a container fill level. The controller may determine a total volume of the container and a free volume of the container based on the second sensor data to determine a fill level of the container.

In an example, the flow includes operation 1208, where the controller determines an integrity of the container based on the first container integrity check and the second container integrity check. The integrity may represent whether the container is associated with a defect. For instance, the first integrity check may indicate that a barcode is not detected, and therefore the container has a container identification read defect. Or, the second integrity check may indicate that the fill level is outside of a fill range, and therefore the container has a container fill defect.

In an example, the flow includes operation 1210, where the controller causes a corrective action based on the integrity of the container indicating the defect. The defect can be indicated to a conveyor controller of the material handling equipment, which initiates the corrective action. The corrective action may involve moving the container to another path of the material handling equipment or off of the material handling equipment to an area designated for defective containers.

FIG. 13 illustrates an example of a flow for initiating and modifying container inspection. In an example, the flow includes operation 1302, where the controller receives first sensor data indicating a detection of a container prior to the container reaching an entrance of a scanning tunnel. The scanning tunnel is mounted over a portion of material handling equipment on which the container moves. The first sensor data can be generated by a first sensor, such as a photo eye that detects the container.

In an example, the flow includes operation 1304, where the controller causes processing of second sensor data and third sensor data during movement of the container in the scanning tunnel. Based on the detection of the container, the controller can cause the processing of the second sensor data and the third sensor data. The second sensor data and the third sensor data may be generated by one or more of a three-dimensional scanner, a container identification reader, and a weight sensor.

In an example, the flow includes operation 1306, where the controller receives fourth sensor data indicating a speed of the container or a container-to-container distance. The fourth sensor data can be generated by a set of encoders.

In an example, the flow includes operation 1308, where the controller causes a change to a speed of the container based on the fourth sensor data. The controller may additionally or alternative cause a change to a rate at which sensor data is generated or a rate at which sensor data is processed.

Figure 14:
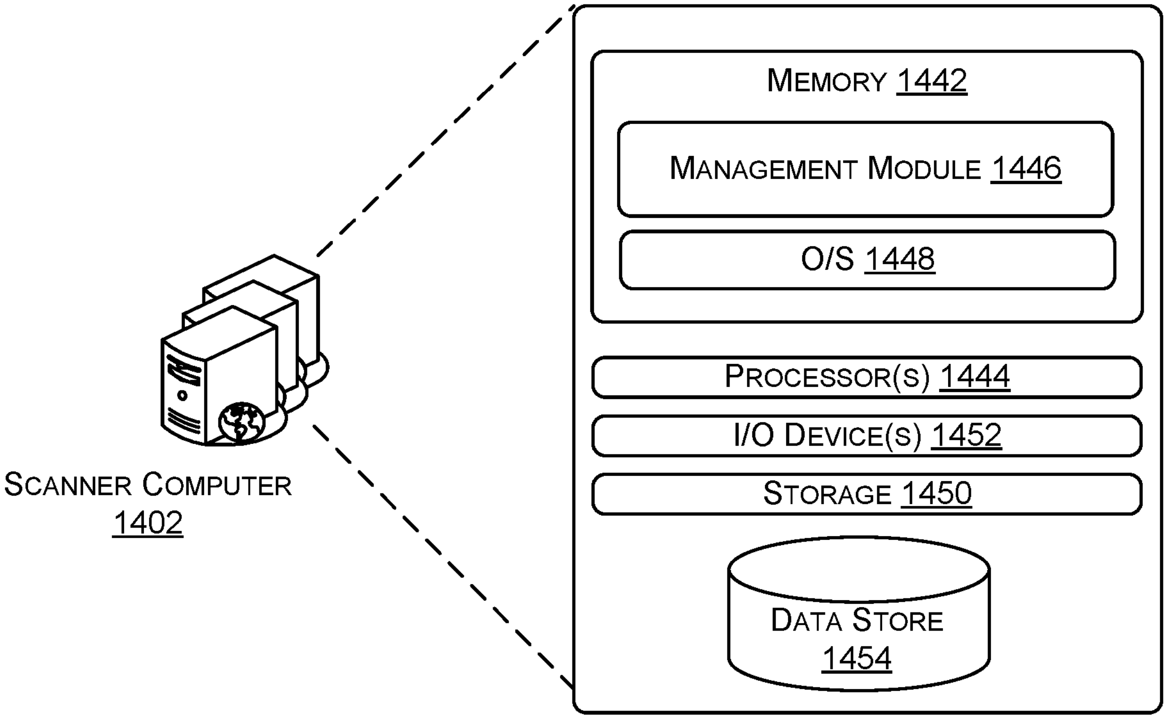
FIG. 14 is an example system architecture for a scanner computer that implements aspects of container inspection, in accordance with at least one embodiment.

FIG. 14 is an example system architecture for a scanner computer 1402 that implements aspects of container inspection, in accordance with at least one embodiment. The scanner computer 1402 may be associated with operations involving receiving, storing, and/or delivering of items from a warehouse to one or more item drop-off locations. All or some components of the scanner computer 1402 can correspond to a scanner controller described herein above.

The scanner computer 1402, may be configured to receive sensor data as part of a container inspection system. The scanner computer 1402 may include at least one memory 1442 and one or more processing units (or processor(s)) 1444. The processor(s) 1444 may be implemented as appropriate in hardware, computer-executable instructions, software, firmware, or combinations thereof. Computer-executable instruction, software or firmware implementations of the processor(s) 1444 may include computer-executable or machine-executable instructions written in any suitable programming language to perform the various functions described.

The memory 1442 may include more than one memory. The memory 1442 may store program instructions that are loadable and executable on the processor(s) 1444, as well as data generated during the execution of these programs. Depending on the configuration and type of memory, the memory 1442 may be volatile (such as random access memory (RAM)) and/or non-volatile (such as read-only memory (ROM), flash memory, or other memory). The scanner computer 1402 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1442 may include multiple different types of memory, such as static random access memory (SRAM), dynamic random access memory (DRAM), or ROM.

Turning to the contents of the memory 1442 in more detail, the memory 1442 may include an operating system 1448 and one or more application programs, modules or services for implementing the features disclosed herein including a management module 1446. The management module 1446 may be configured to receive sensor data, detect defects based on the sensor data, and send indications of defects to another controller to perform a corrective action.

In some examples, the scanner computer 1402 may also include additional storage 1450, which may include removable storage and/or non-removable storage. The additional storage 1450 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1442 and the additional storage 1450, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the scanner computer 1402. The modules of the scanner computer 1402 may include one or more components. The scanner computer 1402 may also include input/output (I/O) device(s) 1452 and/or ports, such as for enabling connection with a keyboard, a mouse, a pen, a voice input device, a touch input device, a display, speakers, a printer, or other I/O device.

In some examples, the scanner computer 1402 may also include data store 1454. The data store 1454 may include one or more databases, data structures, or the like for storing and/or retaining any suitable information associated with the scanner computer 1402. In some examples, the scanner computer 1402 may store the sensor data with various containers, defects of containers, or any suitable information related to the examples provided herein.

The various embodiments can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A material handling system comprising:

material handling equipment comprising a first controller and at least one of a conveyor belt or conveyor rolls, and configured to move a container;

a frame forming a scanning tunnel and mounted around a portion of the material handling equipment such that to surround at least a section of the conveyor belt or a set of the conveyor rolls;

a first sensor having a first sensor type, attached to the frame, and configured to generate first sensor data of a first sensor data type during movement of the container in the scanning tunnel, the movement caused by the material handling equipment;

a second sensor having a second sensor type different than the first sensor type, attached to the frame, and configured to generate second sensor data of a second sensor data type during the movement of the container in the scanning tunnel;

a third sensor disposed inside the scanning tunnel at a height of an upper surface of the container and configured to generate third sensor data indicating whether an item over-height is sensed; and a second controller configured to:

receive, during the movement of the container in the scanning tunnel, the first sensor data and the second sensor data;

perform a first container integrity check based at least in part on the first sensor data;

perform a second container integrity check based at least in part on the second sensor data, the second container integrity check being of a different type than the first container integrity check;

perform a third container integrity check based at least in part on the third sensor data, wherein the third container integrity check indicates the item over-height upon the third sensor data also indicating the item over-height;

determine an integrity of the container based at least in part on the first container integrity check, the second container integrity check, and the third container integrity check; and cause, based at least in part on the integrity of the container indicating a defect and by at least sending a defect indication to the first controller, a corrective action to be initiated by the material handling equipment after the container exits the scanning tunnel.

2. The material handling system of claim 1, wherein the first container integrity check comprises at least one of: a container identifier read, a container fill level, an item over-height detection, a container assembly, a container crack, or a container warping, and wherein the second container integrity check comprises at least a remaining one of the container identifier read, the container fill level, the item over-height detection, the container assembly, the container crack, or the container warping.

3. The material handling system of claim 1, wherein the scanning tunnel comprises an entrance through which the container is moved into the scanning tunnel, and wherein the material handling system further comprises:

a fourth sensor disposed outside of the scanning tunnel and configured to generate fourth sensor data indicating a detection of the container prior to the container reaching the entrance, wherein the fourth sensor data causes the second controller to at least start processing the first sensor data and the second sensor data.

4. The material handling system of claim 1, further comprising:

a set of sensors configured to generate fourth sensor data indicating a speed of the container or a container-to-container distance, and wherein the second controller is further configured to cause, based at least in part on the fourth sensor data, the first controller to change the speed of the container.

5. A system comprising:

a frame configured to form a scanning tunnel by at least surrounding a portion of a material handling equipment;

a first sensor attached to the frame and configured to generate first sensor data during movement of a container in the scanning tunnel, the movement caused by the material handling equipment;

a second sensor attached to the frame and configured to generate second sensor data during the movement of the container in the scanning tunnel; and a controller configured to:

receive, during the movement of the container in the scanning tunnel, the first sensor data and the second sensor data;

perform a first container integrity check based at least in part on the first sensor data, wherein the first container integrity check indicates whether a warping defect of the container exists based at least in part on distance measurements between walls of the container, wherein the distance measurements are generated based at least in part on the first sensor data;

perform a second container integrity check based at least in part on the second sensor data; and cause a corrective action to be initiated based at least in part on at least one of the first container integrity check or the second container integrity check indicating a container defect.

6. The system of claim 5 further comprising:

an area centered in the scanning tunnel and over a conveyor surface such that the container is moved through the area within the scanning tunnel.

7. The system of claim 5, wherein the first sensor comprises a three-dimensional scanner that is attached to an upper surface of the frame and that has a field of view directed to inside the scanning tunnel, wherein performing the first container integrity check comprises detecting a fill level of the container and determining whether the fill level is outside of a fill range.

8. The system of claim 7, wherein performing the first container integrity check further comprises determining an item over-height by at least detecting an item contained in the container and determining whether a portion of the item extends beyond an upper surface of the container.

9. The system of claim 8, further comprising:

a third sensor disposed inside the scanning tunnel at a height of the upper surface of the container and configured to generate third sensor data, wherein the controller is triggered to determine the item over-height based at least in part on the third sensor data also indicating the item over-height.

10. The system of claim 5 further comprising:

a third sensor that is configured to generate third sensor data and that is of a same type as the first sensor and of a different type than the second sensor, wherein the first sensor and the third sensor are attached to respective locations on the frame based at least in part on expected locations of container identifiers installed on the container, wherein the first sensor data corresponds to a read of a first container identifier, wherein the third sensor data corresponds to a read of a second container identifier.

11. The system of claim 5 further comprising:

a weight sensor installed in-line in the material handling equipment inside or outside the scanning tunnel and configured to generate weight data during the movement of the container, wherein the weight data indicates a weight of the container, and wherein the controller is further configured to:

determine a type of the container;

determine a weight range associated with the type of the container;

receive the weight data;

determine, based at least in part on the weight data, whether the weight is outside of the weight range; and trigger the corrective action based at least in part on the weight being outside of the weight range.

12. The system of claim 5 further comprising:

a third sensor disposed outside of the scanning tunnel and configured to generate third sensor data indicating a detection of the container prior to the container reaching the scanning tunnel, wherein the third sensor data causes the controller to at least start processing the first sensor data and the second sensor data.

13. The system of claim 5 further comprising:

a set of third sensors configured to generate third sensor data indicating a speed of the container or a container-to-container distance, and wherein the controller is further configured to cause, based at least in part on the third sensor data, to change at least one of: the speed of the container, a first rate at which sensor data is generated, or a second rate at which the sensor data is processed.

14. A method implemented by a system, the method comprising:

determining, during movement of a container in a scanning tunnel, first sensor data, the first sensor data generated by a first sensor attached to a frame that forms the scanning tunnel by at least surrounding a portion of a material handling equipment, the movement caused by the material handling equipment;

determining, during the movement of the container in the scanning tunnel, second sensor data, the second sensor data generated by a second sensor attached to the frame;

performing a first container integrity check based at least in part on the first sensor data, wherein the first container integrity check indicates whether an assembly defect of the container exists based at least in part on distance measurements between edges of the container, wherein the distance measurements are generated based at least in part on the first sensor data;

performing a second container integrity check based at least in part on the second sensor data; and causing a corrective action to be initiated based at least in part on at least one of the first container integrity check or the second container integrity check indicating a container defect.

15. The method of claim 14, wherein performing the first container integrity check comprises:

determining, based at least in part on the first sensor data, a first distance between a first point on a first wall of the container and a second point on a second wall of the container;

determining, based at least in part on the first sensor data, a second distance between a third point on the first wall and a fourth point on the second wall;

determining that a difference between the first distance and the second distance exceeds a distance threshold; and determining a warping defect of the container based at least in part on the difference, wherein the first container integrity check indicates the warping defect.

16. The method of claim 14, wherein performing the first container integrity check comprises:

determining, based at least in part on the first sensor data, a corner of the container, wherein the corner is formed by a first wall of the container and a second wall of the container;

determining a distance between a first edge point of the first wall and a second edge point of the second wall; and determining that the distance is outside a distance range, wherein the assembly defect of the container is determined based at least in part on the distance.

17. The method of claim 14, wherein performing the first container integrity check comprises:

determining a total volume of the container based at least in part on a type of the container;

determining, based at least in part on the first sensor data, at least one of: a used volume or a free volume of the container, wherein the used volume corresponds to occupancy of the container by a set of items contained in the container;

determining a fill level based at least in part on the total volume and the at least one of the used volume or the free volume;

determining that the fill level is outside a fill range; and determining a fill level defect of the container based at least in part on the fill level, wherein the first container integrity check indicates the fill level defect.

18. The method of claim 14, wherein performing the first container integrity check comprises:

determining, based at least in part on the first sensor data and a type of the container, an edge of an upper surface of the container;

determining, based at least in part on the first sensor data, that an item contained in the container extends beyond the upper surface; and determining an over-height level defect of the container based at least in part on the item extending beyond the upper surface, wherein the first container integrity check indicates the over-height level defect.

19. The method of claim 14 further comprising:

generating an input to a machine learning model based at least in part of the first sensor data and the second sensor data; and determining an output of the machine learning model, the output generated based at least in part on the input and indicating the container defect.

20. The method of claim 14, wherein causing the corrective action to be initiated comprises causing the container to be moved from a first conveyor lane to a second conveyor lane, wherein the frame is installed in-line in the first conveyor lane, and wherein the second conveyor lane is associated with defective containers.

* * * * *